(12) United States Patent
Sun

(10) Patent No.: US 10,126,496 B1
(45) Date of Patent: Nov. 13, 2018

(54) REVERSE BIAS MODULATING MULTI-MATERIAL WAVEGUIDE/DIODE

(71) Applicant: Chen-Kuo Sun, Escondido, CA (US)

(72) Inventor: Chen-Kuo Sun, Escondido, CA (US)

( * ) Notice: Subject to any disclaimer, the term of this patent is extended or adjusted under 35 U.S.C. 154(b) by 0 days.

(21) Appl. No.: 15/683,112

(22) Filed: Aug. 22, 2017

Related U.S. Application Data

(63) Continuation-in-part of application No. 15/649,094, filed on Jul. 13, 2017.

(51) Int. Cl.
*G02F 1/035* (2006.01)
*G02B 6/12* (2006.01)
*G02F 1/025* (2006.01)

(52) U.S. Cl.
CPC ............... *G02B 6/12* (2013.01); *G02F 1/025* (2013.01); *G02B 2006/12123* (2013.01); *G02B 2006/12145* (2013.01)

(58) Field of Classification Search
CPC ........ G02B 2006/12145; G02B 6/2813; G02B 6/29316; G02B 6/3536; G02B 2006/1209;
(Continued)

(56) References Cited

U.S. PATENT DOCUMENTS

| | | |
|---|---|---|
| 4,001,744 A | 1/1977 | Conrad |
| 4,008,947 A | 2/1977 | Baues |

(Continued)

FOREIGN PATENT DOCUMENTS

| | | |
|---|---|---|
| CN | 2071793 U | 2/1991 |
| JP | 07043656 A | 2/1995 |

(Continued)

OTHER PUBLICATIONS

Hui Yu et al., "Performance tradeoff between lateral and interdigitated doping patterns for high speed carrier-depletion based silicon modulators", Optical Express, Jun. 4, 2012, vol. 20, No. 12, pp. 12926-12938.

(Continued)

*Primary Examiner* — Rhonda Peace
(74) *Attorney, Agent, or Firm* — Nydegger & Associates

(57) ABSTRACT

In accordance with the present invention the switching element of an optical switch for switching/modulating an optical signal from one optical waveguide to another is a reverse bias diode. More particularly, the diode is itself an optical waveguide that has been doped to create a predetermined depletion width, $W_d$, between the N-type and IP-type regions of the diode. In operation, an optical signal is input into the waveguide/diode in a manner that generates a second order mode for the optical signal. The second order mode optical signal then transits the waveguide/diode back and forth through the depletion width $W_d$. A switching voltage, $V_\pi$, which is selectively applied to the waveguide/diode, can then alter the depletion width $W_d$ of the waveguide/diode. Consequently, the propagation interference distance, $\lambda_c$, of the waveguide/diode will also be changed, to thereby direct the optical signal from one output optical filter to another.

17 Claims, 3 Drawing Sheets

(58) Field of Classification Search
CPC ............. G02F 2001/0152; G02F 1/015; G02F 1/01708
See application file for complete search history.

(56) References Cited

U.S. PATENT DOCUMENTS

| | | | |
|---|---|---|---|
| 4,127,320 A * | 11/1978 | Li | G02F 1/3137 |
| | | | 385/16 |
| 4,240,693 A | 12/1980 | Johnson | |
| 4,525,687 A | 6/1985 | Chemla | |
| 4,728,167 A * | 3/1988 | Soref | G02F 1/025 |
| | | | 385/130 |
| 4,840,446 A | 6/1989 | Nakamura | |
| 5,004,447 A * | 4/1991 | Soref | G02F 1/3133 |
| | | | 257/14 |
| 5,159,699 A | 10/1992 | de Monts | |
| 5,917,980 A | 6/1999 | Yoshimura | |
| 5,937,115 A | 8/1999 | Domash | |
| 6,310,999 B1 | 10/2001 | Marcuse | |
| 6,836,585 B2 | 12/2004 | Trissel | |
| 6,928,248 B2 | 8/2005 | Achour | |
| 7,860,358 B2 * | 12/2010 | Tsuda | G02F 1/3132 |
| | | | 385/16 |
| 9,046,704 B2 | 6/2015 | Costache | |
| 2003/0219197 A1 | 11/2003 | Kawamoto | |
| 2003/0231394 A1 | 12/2003 | Kimura | |
| 2004/0240784 A1 | 12/2004 | Shih | |
| 2004/0247236 A1 | 12/2004 | Yoshimura | |
| 2005/0254752 A1 | 11/2005 | Domash | |
| 2006/0261432 A1 | 11/2006 | Yoshimura | |
| 2007/0014519 A1 | 1/2007 | Aoki | |
| 2009/0263078 A1 * | 10/2009 | Hosomi | G02B 6/12004 |
| | | | 385/14 |
| 2013/0034323 A1 | 2/2013 | Costache | |
| 2014/0226974 A1 | 8/2014 | Sun | |
| 2015/0093067 A1 | 4/2015 | Manouvrier | |
| 2017/0336658 A1 * | 11/2017 | Chen | G02F 1/025 |

FOREIGN PATENT DOCUMENTS

| | | |
|---|---|---|
| JP | 11237652 A | 8/1999 |
| SU | 1118878 A1 | 10/1984 |

OTHER PUBLICATIONS

F. Dollinger et al., "Ultrashort low-loss optical multiquantum-well GaAs/GaAlAs vertical directional coupler switch", Electronics Letters, Aug. 1, 1996, vol. 32, No. 16, p. 1509.

Asaki Kohtoku et al., "Switching Operation in a GaInAs—InP MQW Integrated-Twin-Guide (ITG) Optical Switch", IEEE Photonics Technology Letters, Mar. 1991, vol. 3, No. 3, pp. 225-226.

Masaki Kohtoku et al., "High-Speed InGaAlAs—InAlAs MQW Directional Coupler Waveguide Switch Modules Integrated with a Spotsize Converter Having a Lateral Taper, Thin-Film Core, and Ridge", Journal of Lightwave Technology, Mar. 2000, vol. 18, No. 3, pp. 360-369.

Herrera et al., "Silicon / electro-optic polymer hybrid directional coupler switch", Optical Interconnects XIV, 2014, Proc. of SPIE vol. 8991, pp. 89910Q-1-89910Q-8.

* cited by examiner

REVERSE BIAS MODULATING MULTI-MATERIAL WAVEGUIDE/DIODE

This application is a continuation-in-part of application Ser. No. 15/649,094, filed Jul. 13, 2017, which is currently pending. The contents of application Ser. No. 15/649,094 are incorporated herein by reference.

FIELD OF THE INVENTION

The present invention pertains generally to systems and methods for switching optical signals from one optical waveguide to another. More particularly, the present invention pertains to systems and methods for switching and modulating optical signals that have already been modulated by their second order mode as well as higher order modes as they transit a waveguide. The present invention is particularly, but not exclusively, useful for systems and methods that employ optical switches, wherein the switching element of the optical switch is a reverse bias diode.

BACKGROUND OF THE INVENTION

By definition, a PN junction is the interface between two regions in a semiconductor crystal which have been treated (i.e. doped) so that one region is a P-type semiconductor and the other is an N-type semiconductor; it contains a permanent dipole charge layer (McGraw-Hill Dictionary of Scientific and Technical Terms: Sixth Edition 2003). More particularly, from a technical perspective, the P-type region includes "holes" and the N-type region includes "electrons". In this combination, the permanent dipole charge layer (i.e. a space charge layer) is located between the regions.

As its nomenclature suggests, the space charge layer between the P-type region and the N-type region will be charged. Further, it will have a depletion width, $W_d$, that is initially determined by the electrical characteristics of the P-type and N-type regions, Importantly, it is known according to the plasma dispersion effect that the index of refraction of a semiconductor material will change as its free carrier concentration is changed. Therefore, the effective refractive index, n, of the PN diode will change as the depletion width $W_d$ is changed. It happens that these changes can be induced electronically by the application of an external voltage.

It is well known that semiconductor materials exhibit a phenomenon that is known as the plasma dispersion effect. In brief, this effect is related to the density of free electron carriers in a semiconductor material. More specifically, this free electron density is determined by the concentration of "electrons" in the N-type region of a PN junction, and by the concentration of "holes" in the J-type region of the PN junction. Of particular interest for the present invention is how the plasma dispersion effect changes the index of refraction of a semiconductor material, and the affect this change will have on an optical signal as it passes through a PN junction.

Along with a consideration of PN junctions as mentioned above, the characteristics of optical waveguides are also important for the present invention. In particular, the interest here is on the nature of light beams and their interaction with an optical waveguide. First, consider a single mode light beam which has no higher order modes and exhibits only what is generally referred to as the fundamental mode. As a distinguishing feature, it is well known that unlike a multi-mode light beam which includes higher order modes, a single mode light beam will follow a straight line path through an optical waveguide. On the other hand, a higher order mode light beam (e.g. second order mode) primarily will follow a sinusoidal path which passes back and forth across a center line through the optical waveguide due to mode propagation interference.

The present invention has recognized several possibilities from the technical considerations mentioned above that lead toward the use of an optical waveguide as a reverse bias switching/modulating diode. For one, the present invention recognizes that an optical waveguide, which is made of a semiconductor material (e.g. silicon), can be "doped" to create a PN junction. Specifically, both a P-type region and an N-type region, with a space charge layer therebetween, can be manufactured as an optical waveguide to effectively create a waveguide/diode. For another, the present invention recognizes that by introducing a higher order mode optical signal (e.g. second order) into the waveguide/diode, the sinusoidal beam path of the optical signal will cause it to transit back and forth through the space charge region. By changing the external voltage, the depletion width $W_d$ and its corresponding effective index n of the diode will change, and the beam path of the optical signal will be cumulatively changed as it passes back and forth through the space charge region in the waveguide/diode. Moreover, this change in beam path can then be effectively used to selectively direct (i.e. switch) the optical signal as an output from the waveguide/diode onto either of two output optical waveguides.

In light of the above, it is an object of the present invention to provide a reverse bias switching/modulating diode wherein the switching element is itself an optical waveguide. Another object of the present invention is to provide a reverse bias switching/modulating diode that effectively provides for optical switching of higher order mode optical signals. Yet another object of the present invention is to provide a reverse bias switching/modulating diode that is easy to manufacture, is simple to use, and is comparatively cost effective.

SUMMARY OF THE INVENTION

In accordance with the present invention, an optical waveguide is created as a reverse bias switching/modulating diode for use as the switching element of an optical modulator. For this purpose, the optical waveguide is made as a FN junction using a semiconductor material (e.g. silicon) having an effective index of refraction n. During its manufacture, the optical waveguide is doped to create a P-type region and an N-type region. A consequence here is that a space charge region is also created between the two regions, and this space charge region will have a depletion width $W_d$ which is determined by the electrical characteristics of the P-type region and the N-type region. In this combination, the optical waveguide has a first end and a second end with the P-type region, the N-type region, and the space charge region, all extending together between the first and second ends of the waveguide. This construction effectively creates a waveguide/diode.

At least one optical input waveguide is connected to the first end of the waveguide/diode to provide an optical input signal that will transit through the waveguide/diode. As mentioned above, it is an important feature of the present invention that this optical input signal have a dominating higher order mode, e.g. a second order mode signal. Thus, to achieve this purpose for the present invention, two optical input waveguides need to be positioned at a predetermined location at the first end of the waveguide/diode. In particular, with the waveguide/diode defining a central axis, the predetermined location for connecting the two input optical waveguides to the waveguide/diode needs to be offset oppositely from the central axis by an offset distance $d_{offset}$. The input light beam is guided into one of the two input waveguides and it will be cross-coupled between the two waveguides to create a higher order mode input signal, when transitioning into the waveguide/diode section.

In addition to the optical input waveguide, the present invention envisions there will also be two output waveguides which are each attached to the second end of the waveguide/diode. Preferably, each of the optical output waveguides are attached to separate areas of the second end of the waveguide/diode, and they will be symmetrically positioned relative to the central axis of the waveguide/diode.

A voltage source is connected to the waveguide/diode on opposite sides of its space charge region to establish a reverse bias for the waveguide/diode when a base voltage $V_{base}$ is applied to the waveguide/diode. Thereafter, a switching voltage $V_\pi$ can be selectively added to (or subtracted from) $V_{base}$ to increase (decrease) the electric field in the space charge region. In the event, this also simultaneously changes the depletion width $W_d$ in the space charge region. With this change in the depletion width $W_d$ of the space charge region, the effective index of refraction n of the waveguide/diode also changes. As disclosed in greater detail below, this change in the effective index of refraction n, due to the change of depletion width $W_d$ in the space charge region, allows the present invention to direct the input optical signal onto a preselected output optical waveguide at the second end of the waveguide/diode.

For an operation of the present invention, the base voltage $V_{base}$, the switching voltage $V_\pi$ and the manufactured profile of the P-type region and the N-type region of the waveguide/diode will each, individually or collectively, account for the depletion width $W_d$ of the space charge region. Recall, it is the base voltage $V_{base}$ and the PN junction profile that establish the reverse bias for the waveguide/diode. On the other hand, it is the switching voltage $V_\pi$, alone, that operationally changes the depletion width $W_d$ and its corresponding free carrier concentration in the space charge region. According to the plasma dispersion effect, the change of free carrier concentration will change its corresponding index of refraction. Thus, the effective index of refraction n will be changed along with the switching voltage $V_\pi$. Importantly, when $V_\pi$ has changed n, the path of a higher order mode optical signal will experience a change in its higher order mode propagation interference distance $\lambda_c$ each time it transits through the space charge region. Accordingly, this change of $\lambda_c$ is cumulative along a length L of the waveguide/diode. As a consequence, with an appropriate design consideration of $V_\pi$ and L, the present invention is able to direct the input optical signal from one output optical waveguide onto the other output optical waveguide.

Mathematically, considerations for the present invention include the recognition that the length L of the waveguide/diode, the higher order mode propagation interference distance $\lambda_c$, and the changes in $\lambda_c$ (i.e. $\Delta\lambda_c$), are related through the expressions: $L=N\lambda_c$ and $\lambda_c \cong (N\pm1)\Delta\lambda_c$, where N is a positive real number greater than 10. For the present invention the length L is preferably greater than 100 μm and, preferably, $V_{base}+V_\pi<10$ volts.

For an alternate embodiment of the present invention, the structure of a waveguide/diode incorporates a PN junction that can include two different semiconductor materials. Specifically, for the waveguide/diode of the alternate embodiment, a P-type region is made of a semiconductor material having a first plasma dispersion effect (e.g. silicon). Its N-type region is then made of a different semiconductor material which has a different plasma dispersion effect (e.g. InGaAsP). In combination, the two different semiconductor materials are bound directly to one another, or they can be separated and bounded (i.e. joined) together by an oxide layer (e.g. silica).

Operationally, the alternate embodiment functions as similarly disclosed for the preferred embodiment. The alternate embodiment, however, provides different electrical capabilities that allow for flexibility in the design and use of structural components for improved performance characteristics. In particular, a significant operational factor of the alternate embodiment is the fact that the plasma dispersion effect of the N-type region (e.g. InGaAsP) is more than two times greater in magnitude than that of the P-type region (e.g. silicon).

Due to the disparity between the respective plasma dispersion effects, the structural design features of the present invention that can be most easily varied to improve overall performance include: 1) the magnitude of the switching voltage $V_\pi$, which can be lower, and 2) the length L of the waveguide/diode, which can be shorter than is otherwise possible. Moreover, as will be appreciated by the skilled artisan, the operational parameters $V_\pi$ and L are interrelated by a figure of merit defined as $V_\pi L$. Thus, they can be respectively selected to balance each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
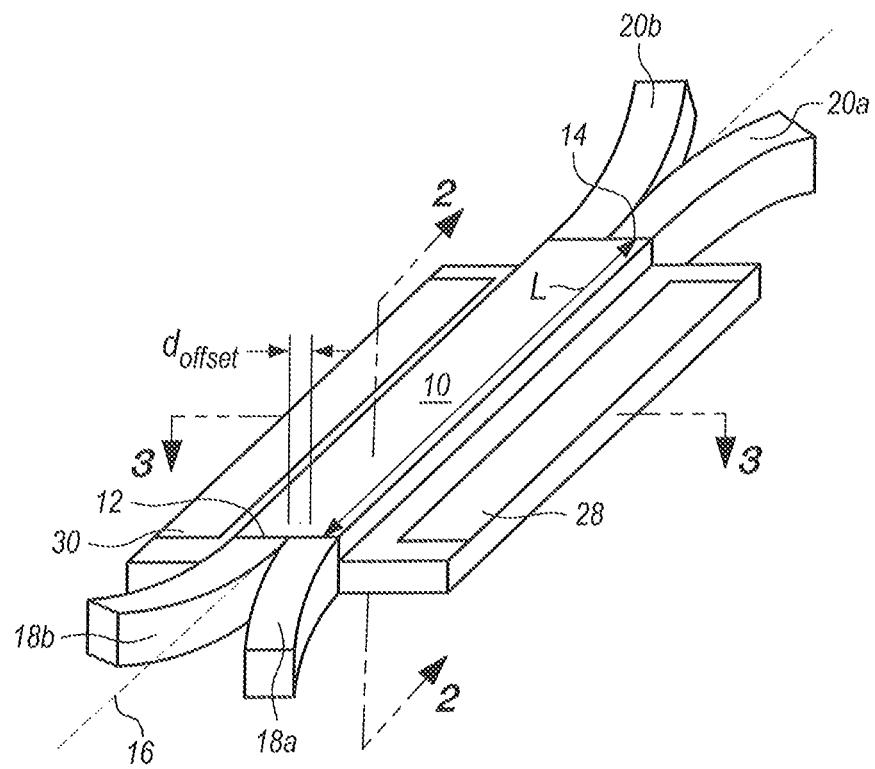
FIG. 1 is a perspective view of a waveguide/diode in accordance with the present invention.

Referring initially to FIG. 1, a waveguide/diode in accordance with the present invention is shown and is generally designated 10. Preferably, the waveguide/diode 10 is made of a semiconductor material, such as silicon. Also, as shown, the waveguide/diode 10 preferably has an elongated body portion that extends through a length L from a first end 12 to a second end 14, and it defines a central axis 16. Further, two input optical waveguides 18a and 18b are attached to the first end 12 of the waveguide/diode 10, and a pair of output optical waveguides 20a and 20b are attached to the second end 14 of the waveguide/diode 10.

Figure 2:
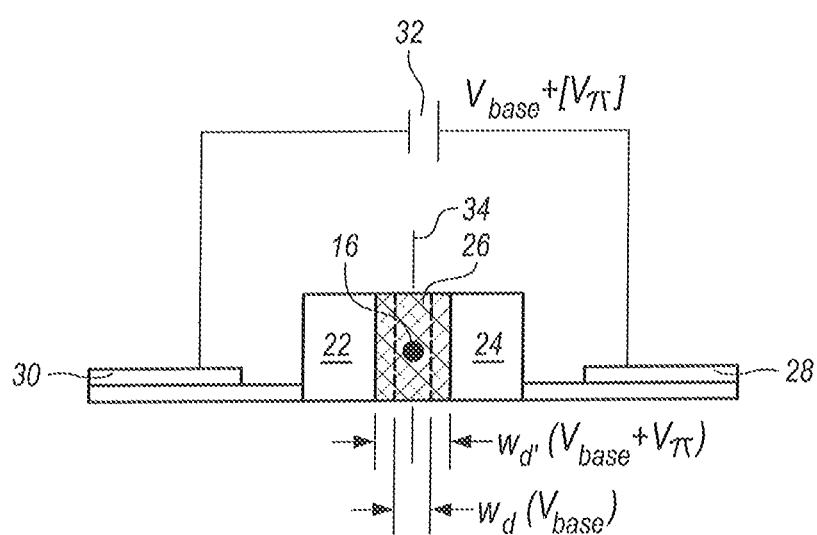
FIG. 2 is cross-section view of the waveguide/diode as seen along the line 2-2 in FIG. 1, showing a profile of the PN junction of the present invention.

By referring to FIG. 2, it will be appreciated that the waveguide/diode 10 includes a P-type region 22 and an N-type region 24, with a cross charge region 26 that is located between them. Functionally, for purposes of the present invention, the P-type region 22 and the N-type region 24 of the waveguide/diode 10, together with the cross charge region 26, present a typical PN profile that is like any PN junction known in the pertinent art. Further, like any diode known in the pertinent art, the waveguide/diode 10 of the present invention includes an anode 28 and a cathode 30 that are respectively connected with a voltage source 32. For the present invention, because the anode 28 (positive) is connected to the N-type region 24 of the waveguide/diode 10, and the cathode 30 (negative) is connected to the P-type region 22, the waveguide/diode 10 is reverse biased.

Still referring to FIG. 2, it is to be appreciated that the voltage source 32 will generate a base voltage $V_{base}$ which establishes the reverse bias for the waveguide/diode 10. In addition to $V_{base}$, the voltage source 32 will also provide a switching voltage $V_\pi$ that is necessary for an operation of the present invention. The importance here is that, as shown in FIG. 2, with only $V_{base}$ applied, the depletion width $W_d$ of the cross charge region 26 will be different from the depletion width $W_d'$ that results when the switching voltage $V_\pi$ is applied. The consequence here is that as the switching voltage $V_\pi$ changes the depletion width between $W_d$ (dashed lines) and $W_d'$ (solid lines), the effective index of refraction n of the waveguide diode having the cross charge region 26 will also be changed.

Figure 3:
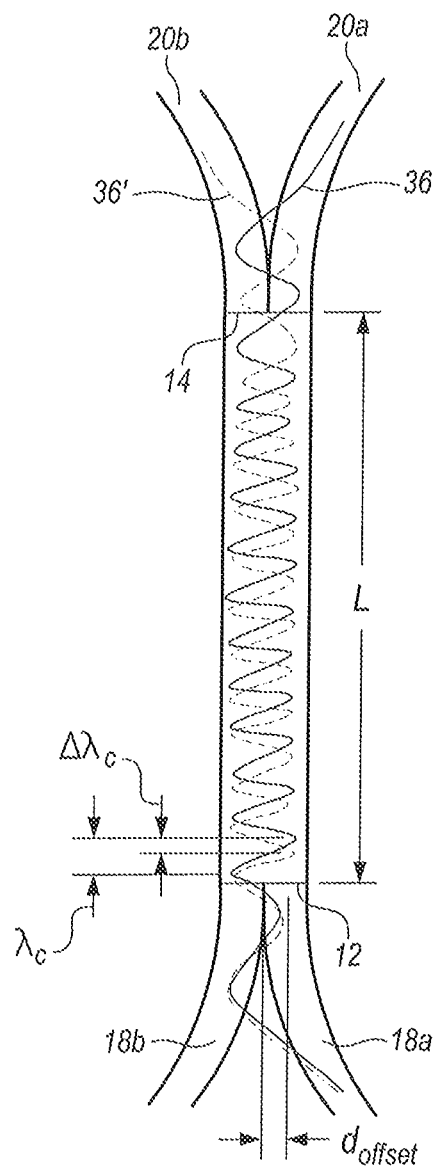
FIG. 3 is a cross-section view of the waveguide/diode as seen along the line 33 in FIG. 1 showing the difference in beam paths between a light beam that is influenced by a switching voltage $V_\pi$ (dashed line) and one that is not influenced (solid line)

In another aspect of the present invention, it is an important feature that the two input optical waveguides 18a and 18b be eccentrically attached to the first end 12 of the waveguide/diode 10. This attachment should be made at a predetermined location that is at an offset distance $d_{offset}$ from the central axis 16. Specifically, this is done to create higher order modes (e.g. in particular, a second order mode) for optical signals as they transit the length L of waveguide/diode 10. As best seen in FIG. 3, the purpose of creating a higher order mode for an optical signal is to have it proceed through the waveguide/diode 10 on a sinusoidal wave path 36/36' having a mode propagation interference length $\lambda_c$, rather than along a straight path as would be the case for an optical signal having only a single, fundamental mode.

For an operation of the present invention, an optical signal enters the waveguide/diode 10 from the input optical waveguide 18a. The signal can then be directed from the waveguide/diode 10 onto either the output optical waveguide 20a or the output optical waveguide 20b simply by applying, or withholding, the switching voltage $V_\pi$. Functionally, this happens because $V_\pi$ causes the depletion width $W_d$ of the cross charge region 26 to change. Consequently, the effective index of refraction n of the waveguide diode having the cross charge region 26 will also change. In turn, as the optical signal transits the length L of the waveguide/diode 10 back and forth through the cross charge region 26 in the plane 34, the second order mode propagation interference distance, $\lambda_c$, of the optical signal also changes by an increment of $\Delta\lambda_c$ as shown in FIG. 3. As all this happens, $\Delta\lambda_c$ is cumulative for each time the wave path 36/36' of the optical signal passes through the cross charge region 26. Accordingly, instead of following an unaltered wave path 36, the summation of $\Delta\lambda_c$ increases along the wave path 36' of the optical signal as it progresses through the waveguide/diode 10. The consequence for the wave path 36 of the optical signal is that it can be changed to a wave path 36' for directing the optical signal from one output optical waveguide 20a onto the other output optical waveguide 20b, or vice versa. Mathematical expressions to support this consequence are satisfied when L and N are selected such that switching occurs when $L=N\lambda_c$ and $\lambda_c \cong (N\pm 1)\Delta\lambda_c$, where N is a positive real number greater than 10.

Figure 4:
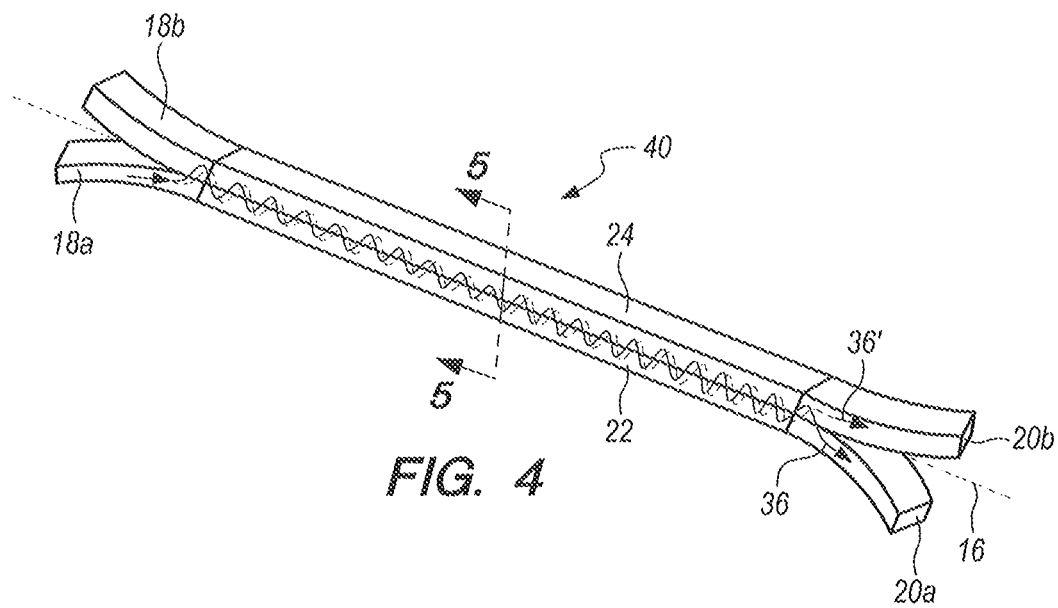
FIG. 4 is a perspective view of an alternate embodiment of the present invention.

Referring now to FIG. 4 an alternate embodiment for the waveguide/diode of the present invention is shown and is generally designated 40. As shown, the waveguide/diode 40 is structurally similar to the waveguide/electrode 10 disclosed above. Both waveguide/diodes 10 and 40 have a similar purpose, and they function similarly. They differ from each other in the nature of the materials used for their manufacture and their consequent electrical characteristics. In detail, the distinctive characteristics of the waveguide/diode 40 will be best appreciated with reference to FIG. 5.

Figure 5:
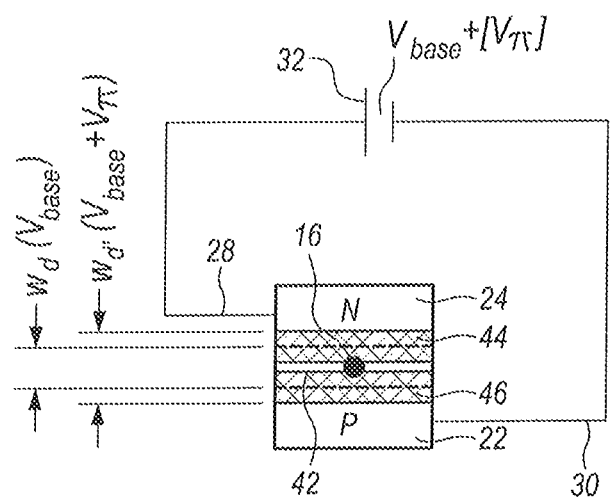
FIG. 5 is a cross-section view of the waveguide/diode as seen along the line 5-5 in FIG. 4.

With reference to FIG. 5 it is to be appreciated that the P-type region 22 and the N-type region 24 are made of different semiconductor materials. In particular, the difference is characterized by the fact that the regions 22 and 24 each exhibit a different plasma dispersion effect. Nevertheless, the P-type region 22 and the N-type region 24 need to be somehow bonded, or joined, together.

As shown in FIG. 5, the present invention envisions the use of an oxide layer 42 for the purpose of joining the regions 22 and 24 together. For example, the present invention envisions a PN junction wherein the N-type region 24 is made of a Multiple-quantum-well (MQM) material such as Indium-Gallium-Arsenide-Phosphide (InGaAsP). In combination with this N-type region 24, the P-type region 22 is envisioned to be silicon (Si), and the oxide layer 42 is silica ($SiO_2$). Other combinations of materials are, or course, possible. In each combination, however, it is important that the two materials are different, and that they will, accordingly, have different plasma dispersion effects.

A consequence of the waveguide/diode 40 is that the N-type region 24 will exhibit an N depletion region 44, and the P-type region 22 will exhibit a P depletion region 46. Together these regions 44 and 46 function similarly to the space charge region 26 of the waveguide/diode 10. In a variation for the alternate embodiment of the waveguide/diode 40, the present invention envisions in a different embodiment, an elimination of the oxide layer 42. In this case, the present invention envisions that the N-type region 24 and the P-type region 22 will be grown together.

In another embodiment of the present invention the current waveguide/diode can also be realized in a structure similar to that shown in FIG. 1 and FIG. 2. In this case, the PN junction waveguide/diode is made of a P-type region 22 from a first semiconductor material (e.g. poly-silicon), an N-type region 24 from a second semiconductor material (e.g. InGaAsP), and a buffer oxide material (e.g. silica) between the P-type semiconductor and the N-type semiconductor.

While the particular Reverse Bias Modulating Multi-Material Waveguide/Diode as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An elongated optical waveguide/diode for use as a switch for optical signals having higher order modes, the waveguide/diode comprising:

a P-type region made of silicon is a first semiconductor material having a first plasma dispersion effect;

an N-type region made of InGaAsP is a second semiconductor material, having a second plasma dispersion effect wherein the first plasma dispersion effect is different than the second plasma dispersion effect; and wherein the P-type region is joined with the N-type region to create a space charge region therebetween the waveguide/diode having an effective index of refraction n; and a voltage source connected between the N-type region and the P-type region for selectively providing a switching voltage $V_\pi$ to alter the wave path of a higher order optical signal as it transits the waveguide/diode during a switching operation.

2. The waveguide/diode recited in claim 1 further comprising an oxide layer joined between the P-type region and the N-type region to create a space charge region therewith, wherein the oxide layer has a thickness T and the waveguide/diode has an effective index of refraction n'.

3. The waveguide/diode recited in claim 2 wherein the oxide layer is silica $SiO_2$.

4. The waveguide/diode recited in claim 1 wherein the voltage source is connected to the waveguide/diode on opposite sides of the space charge region to reverse bias the waveguide/diode with a base voltage $V_{base}$.

5. The waveguide/diode recited in claim 4 wherein the base voltage $V_{base}$ and the switching voltage $V_\pi$ account for a depletion width $W_d$ of the space charge region in a profile of the P-type region and the N-type region, wherein $V_{base}$ creates a depletion width $W_d (V_{base})$, and wherein $V_{base} \pm V_\pi$ creates a different depletion width $W_d' (V_{base} \pm V_\pi)$.

6. The waveguide/diode recited in claim 1 wherein the higher order mode is a second order mode.

7. The waveguide/diode recited in claim 6 wherein the plasma dispersion effect of the second semi-conductor material is more than two times greater in magnitude than the plasma dispersion effect of the first semi-conductor material.

8. The waveguide/diode recited in claim 7 wherein the waveguide/diode has a length L and a figure of merit defined as $V_\pi L$, and wherein the disparity between plasma dispersion effects of the second semi-conductor material, and of the first semi-conductor material allows for selective reductions in $V_\pi$ and L for an operation of the waveguide/diode.

9. The waveguide/diode recited in claim 8 wherein the switching voltage $V_\pi$ changes the second order mode propagation interference distance, $\lambda_c$, of the optical signal by an amount $\Delta\lambda_c$, each time the optical signal transits through the depletion width $W_d$ along the length L of the waveguide/diode, to switch the optical signal from one output optical waveguide to another output optical waveguide.

10. The waveguide/diode recited in claim 9 wherein $L=N\lambda_c$ and $\lambda_c \cong (N\pm 1)\Delta\lambda_c$, where N is a positive real number and N is greater than 10.

11. An elongated optical waveguide/diode for use as a switch for optical signals having higher order modes, the waveguide/diode comprising;
a first electrode having a first plasma dispersion effect wherein the first electrode is a P-type region made of silicon;
a second electrode having a second plasma dispersion effect wherein the second electrode is an N-type region made of InGaAsP and wherein the second electrode has a higher plasma dispersion effect than the first electrode;
an oxide layer for binding the first electrode with the second electrode to establish a space charge region therebetween having a depletion width $W_d$; and
a voltage source connected between the first electrode and the second electrode for selectively providing a switching voltage $V_\pi$ to alter the wave path of a higher order optical signal as it transits the waveguide/diode during a switching operation.

12. The waveguide/diode recited in claim 11 wherein the oxide layer is silica $SiO_2$.

13. The waveguide/diode recited in claim 12 wherein the voltage source is connected to the waveguide/diode on opposite sides of the space charge region to reverse bias the waveguide/diode with a base voltage $V_{base}$.

14. The waveguide/diode recited in claim 13 wherein the base voltage $V_{base}$ and the switching voltage $V_\pi$ account for a depletion width $W_d$ of the space charge region in a profile of the P-type region and the N-type region, wherein $V_{base}$ creates a depletion width $W_d (V_{base})$, and wherein $V_{base} \pm V_\pi$ creates a different depletion width $W_d'(V_{base} \pm V_\pi)$.

15. The waveguide/diode recited in claim 14 wherein the higher order mode is a second order mode and the plasma dispersion effect of the second electrode is more than two times greater in magnitude than the plasma dispersion effect of the first electrode.

16. The waveguide/diode recited in claim 15 wherein the waveguide/diode has a length L and a figure of merit defined as $V_\pi L$, and wherein the disparity between plasma dispersion effects of the second electrode, and of the first electrode allows for selective reductions in $V_\pi$ and L for an operation of the waveguide/diode.

17. The waveguide/diode recited in claim 16 wherein the switching voltage $V_\pi$ changes the second order mode propagation interference distance, $\lambda_c$, of the optical signal by an amount $\Delta\lambda_c$, each time the optical signal transits through the depletion width $W_d$ along the length L of the waveguide/diode, and wherein $L=N\lambda_c$ and $\lambda_c \cong (N\pm 1) \Delta\lambda_c$, where N is a positive real number, to switch the optical signal from one output optical waveguide to another output optical waveguide.

* * * * *

UNITED STATES PATENT AND TRADEMARK OFFICE
CERTIFICATE OF CORRECTION

PATENT NO. : 10,126,496 B1
APPLICATION NO. : 15/683112
DATED : November 13, 2018
INVENTOR(S) : Chen-Kuo Sun It is certified that error appears in the above-identified patent and that said Letters Patent is hereby corrected as shown below:

On the Title Page

Column 2, ABSTRACT, Line 8 - after the word "and" and before the word "regions" in Line 9, DELETE "IP-type" and INSERT -- P-type --.

In the Specification

Column 1, Line 38 - after the word "regions" and before the word "Importantly" DELETE "," and INSERT -- . --.

Column 2, Line 45 - DELETE the first word "FN" and INSERT -- PN --.

Column 4, Line 44 - after the word "line" and before the word "in" DELETE "33" and INSERT -- 3-3 --.

Column 5, Line 11 - after the "." and before the word "the" in Line 12, DELETE "Far" and INSERT -- For --.

Signed and Sealed this
Twenty-ninth Day of January, 2019

Andrei Iancu
*Director of the United States Patent and Trademark Office*